United States Patent [19]
Howsmon et al.

[11] Patent Number: 6,090,859
[45] Date of Patent: Jul. 18, 2000

[54] SMALL CATALYST PARTICLE ADDITION TO SLURRY REACTOR (LAW749)

[75] Inventors: Gregg J. Howsmon; Robert J. Wittenbrink; Claude C. Culross; Louis F. Burns, all of Baton Rouge, La.

[73] Assignee: Exxon Research and Engineering Co., Florham Park, N.J.

[21] Appl. No.: 09/334,332

[22] Filed: Jun. 16, 1999

Related U.S. Application Data

[62] Division of application No. 09/192,037, Nov. 13, 1998.

[51] Int. Cl.[7] ............... C07C 27/00; C07B 63/02; C10G 47/02; C10G 45/00
[52] U.S. Cl. ............ 518/715; 518/700; 518/726; 208/108; 208/211
[58] Field of Search .................. 518/700, 715, 518/726; 208/108, 211

[56] References Cited

U.S. PATENT DOCUMENTS 5,036,032  7/1991  Iglesia et al. .................. 502/260
5,073,661  12/1991  Scheffer et al. ................. 585/640
5,827,903  10/1998  White et al. .................... 518/710

Primary Examiner—Paul J. Killos
Assistant Examiner—J. Parsa
Attorney, Agent, or Firm—Jay Simon; Jonathan Provoost

[57] ABSTRACT

Small particle size catalysts having an average particle size of less than 20 or 10 microns, which agglomerate when contacted with a hydrocarbon liquid, are easily dispersed in the hydrocarbon liquid by first forming a mixture comprising the catalyst particles and one or more non-acidic, liquid polar oxygenates, such as an alcohol, ketone, ester, ether or mixture thereof. The mixture is contacted with the hydrocarbon liquid in which the particles then readily disperse. This process is useful for adding fresh or regenerated small particle size catalyst to catalytic hydroprocessing process slurries, including a reactive Fischer-Tropsch hydrocarbon synthesis slurry. One to four carbon atom alcohols are preferred oxygenates for use with a Fischer-Tropsch slurry.

7 Claims, 2 Drawing Sheets

ବ,090,859

SMALL CATALYST PARTICLE ADDITION TO SLURRY REACTOR (LAW749)

This is a division of application Ser. No. 09/192,037, filed on Nov. 13, 1998.

BACKGROUND OF THE DISCLOSURE

1. Field of the Invention

The invention relates to adding and dispersing small catalyst particles in a hydrocarbon liquid. More particularly the invention relates to a process for adding and dispersing a small particle size Fischer-Tropsch catalyst in a hydrocarbon slurry in a Fischer-Tropsch hydrocarbon synthesis reactor, by forming a mixture of the particles and a liquid, non-acidic, polar oxygenate, preferably a one to four carbon atom alcohol, and adding the mixture to the slurry.

2. Background of the Invention

It is known to conduct chemical processes and reactions in a slurry comprising particulate solids dispersed or suspended in a slurry liquid. Such processes include hydroprocessing reactions, in which hydrogen or a hydrogen containing treat gas is reacted with a hydrocarbonaceous feed in the presence of a particulate catalyst dispersed in a hydrocarbon liquid, to convert the molecular structure of at least a portion of the feed. Also known is a slurry Fischer-Tropsch hydrocarbon synthesis processes, in which a synthesis gas comprising a mixture of $H_2$ and CO is bubbled up into a hydrocarbon slurry liquid in which is dispersed a particulate Fischer-Tropsch type of hydrocarbon synthesis catalyst. The $H_2$ and CO react in the presence of the catalyst to form hydrocarbons, at least a portion of which are liquid at the reaction conditions and form the hydrocarbon slurry liquid. In a hydroprocessing or slurry Fischer-Tropsch hydrocarbon synthesis reactor, the three phases of gas, liquid and solids form a three phase slurry. Such reactors are sometimes referred to as ebulating bed reactors, in which upflowing gas and/or liquid serve to expand and disperse the particulate solids which can comprise either part of the feed (e.g., coal liquefaction) or catalyst, or other particles (such as heat transfer particles), for various hydrogenation and hydrocracking reactions. Such reactions include, in addition to coal liquefaction, hydrogenation, resid fining and other hydrogenation reactions. Reactors which contain a three phase slurry of gas bubbles and particles in a slurry liquid are sometimes referred to as "bubble columns" or "slurry bubble columns", as is disclosed in U.S. Pat. No. 5,348,982. Irrespective of whether a slurry reactor is operated as a dispersed or slumped bed, vigorous three directional mixing conditions are present in the slurry, typically somewhere between the two theoretical conditions of plug flow and back mixed. In all of these processes it is necessary to add fresh or regenerated catalyst particles to the hydrocarbon slurry liquid either continuously or intermittently. For example, U.S. Pat. No. 5,466,362 is typical of the prior art in which catalyst addition to a hydrocarbon slurry is achieved by wetting and slurrying fresh, dry catalyst particles with the hydrocarbon feed liquid and then adding the fresh catalyst slurry to the reactor. However, it has been found that this method is not satisfactory for the case of small particle size catalysts, which are not easily wet by hydrocarbon liquids and which, instead of dispersing, clump up in a hydrocarbon liquid, even under conditions of vigorous stirring or agitation.

SUMMARY OF THE INVENTION

The invention relates to a process for forming a slurry comprising small catalyst particles dispersed in a hydrocarbon liquid, by contacting the particles with a dispersant comprising at least one liquid, non-acidic, polar oxygenated material (hereinafter "polar oxygenate") selected from the group consisting of one or more alcohols, ethers, ketones, esters and mixture thereof, and preferably one or more one to four carbon atom alcohols, such as methanol, to form a mixture comprising the catalyst particles and alcohol, and contacting the mixture with the hydrocarbon liquid, in which the catalyst particles disperse. By small particle size is meant an average particle size below 20 microns and more typically below 10 microns. By liquid is meant liquid at standard conditions of room temperature and pressure. This process is effective for adding and dispersing small size catalyst particles, such as small size Fischer-Tropsch hydrocarbon synthesis catalyst particles, into a hydrocarbon liquid, and is useful for adding fresh and regenerated catalyst to a Fischer-Tropsch slurry used in a slurry Fischer-Tropsch hydrocarbon synthesis process. Further, for the case in which the catalyst and hydrocarbon liquid dispersion is added to, or present in, a reactor, it is preferred that the polar oxygenate volatilize under the temperature and pressure conditions in the reactor. It is understood, of course, that the polar oxygenate should not adversely effect the catalyst, the hydrocarbon liquid, the reaction or the reaction products.

It has been found that both fresh and regenerated, small particle size Fischer-Tropsch hydrocarbon synthesis catalysts, and particularly those containing a catalytic cobalt component, are difficult to disperse in a hydrocarbon liquid. Instead of dispersing, they agglomerate and form masses or clumps of the catalyst particles, irrespective of whether the hydrocarbon liquid is added to the particles or vice-versa. On the other hand, it has been found that these small catalyst particles readily disperse, without clumping, in the presence of one or more polar oxygenates defined above. It has further been found that dispersion occurs even in the presence of a hydrocarbon liquid, in which the particles would otherwise clump. Thus, in another embodiment the invention relates to breaking up clumps comprising small particle size catalyst particles and a hydrocarbon liquid, by contacting the clumps with one or more one or more of the polar oxygenates. In the practice of the invention, therefore, the contacting of the polar oxygenate or mixture of polar oxygenates with the catalyst particles may be done in the presence of a hydrocarbon liquid, in which the catalyst particles would otherwise form clumps. The permissible ratio or range of the polar oxygenate to the hydrocarbon liquid is determined experimentally. Further, when a mixture of the catalyst particles and polar oxygenate (or polar oxygenate and hydrocarbon liquid) is added to a hydrocarbon liquid, or to a Fischer-Tropsch hydrocarbon synthesis slurry, the catalyst particles readily disperse without clumping in the hydrocarbon liquid or slurry. The mixture may be a paste or a flowable or pumpable slurry of the particles and polar oxygenate (or polar oxygenate and hydrocarbon liquid), and preferably a slurry. Most preferred for use in a slurry process are polar oxygenates which decompose in the process to one or more feed components and/or which are produced as products of the particular reaction being conducted in the slurry. Those preferred in a Fischer-Tropsch slurry hydrocarbon synthesis process are methanol and any two to four carbon atom alcohols that can theoretically decompose in the presence of the catalyst under the reaction conditions, to form a mixture of $H_2$ and CO in an $H_2$ to CO molar ratio of at least 1.5 to 1 and preferably 2 to 1. Methanol is particularly preferred, because it does not adversely effect the hydrocarbon synthesis reaction, is a form of "liquid synthesis gas" in that it will theoretically decompose in the reactive slurry to form an equimolar amount of $H_2$ and CO as is explained below, and is produced as a by-product of the reaction. The methanol and other alcohol by-products of the hydrocarbon synthesis may be recovered and used in forming the mixture comprising the particulate catalyst and alcohol.

In the broad case of adding fresh or regenerated small size catalyst particles to a slurry hydroprocessing process, in which the slurry comprises catalyst particles dispersed in a hydrocarbon liquid, the invention comprises forming a mixture comprising the fresh or regenerated catalyst particles and at least one liquid polar oxygenate and adding the mixture to the slurry under conditions of agitation to disperse the particles in the slurry. In the case of a slurry Fischer-Tropsch hydrocarbon synthesis process, the hydrocarbon synthesis slurry also contains uprising gas bubbles. The agitation provided by the uprising gas bubbles, is sufficient to disperse the catalyst particles in the mixture of catalyst particles and polar oxygenate, into the hydrocarbon slurry liquid. In one embodiment relating to a slurry Fischer-Tropsch hydrocarbon synthesis process in which at least a portion of the polar oxygenate used to form the mixture is produced from the synthesis reaction the process comprises:

(a) reacting hydrogen and carbon monoxide in a reactor in the presence of a small particle size hydrocarbon synthesis catalyst in a slurry comprising the catalyst particles and gas bubbles in a hydrocarbon slurry liquid, at reaction conditions effective to form hydrocarbons, a portion of which are liquid at the reaction conditions and comprise the slurry liquid, and (b) forming a mixture comprising small size, fresh or regenerated hydrocarbon synthesis catalyst particles and at least one liquid polar oxygenate and adding the mixture to the slurry in the reactor.

Further embodiments include the liquid polar oxygenate as being one or more one to four carbon atom alcohols which are (i) formed in the reactor by the hydrocarbon synthesis process, (ii) removed from the reactor and, (iii) at least a portion recovered and used to form the mixture of polar oxygenate and catalyst particles. If desired, methanol may be used as the only polar oxygenate to form the mixture. The alcohols produced by the hydrocarbon synthesis reaction dissolve in the water produced from the reaction and may be recovered from the water by means known to those skilled in the art, illustrative, but nonlimiting examples of which include distillation, extraction, absorption, etc.

DETAILED DESCRIPTION

Figure 1:
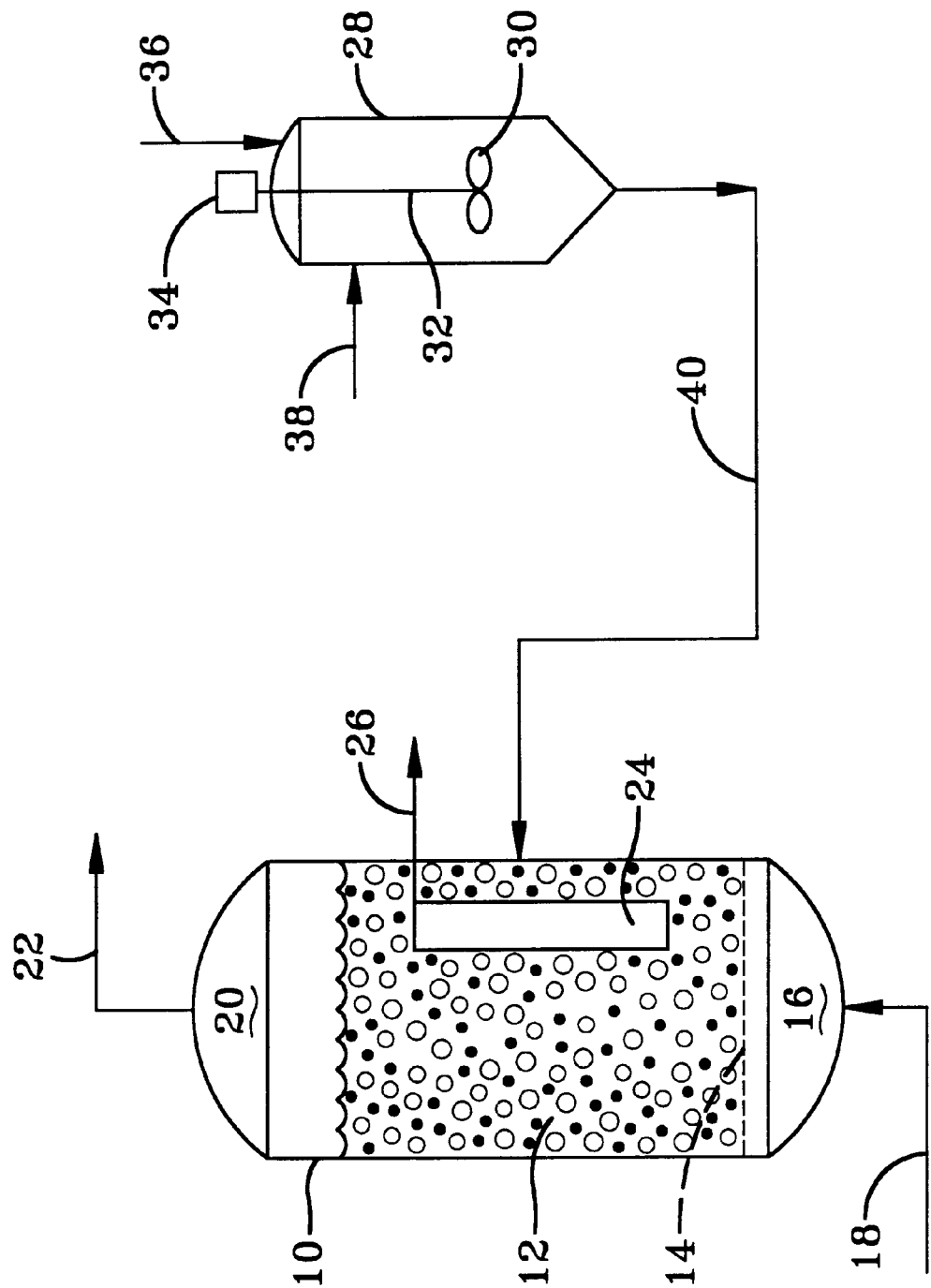
FIG. 1 is a simplified schematic flow scheme for a typical Fischer-Tropsch slurry reactor process of one embodiment of the invention in which fresh catalyst is added to the reactor.

The process of the invention is useful for dispersing fresh and regenerated, small size catalyst particles in a hydrocarbon liquid in which they would otherwise agglomerate and form clumps, by first forming a mixture comprising the catalyst particles and at least one liquid polar oxygenate and then adding the mixture to, or contacting the mixture with, the hydrocarbon liquid. The contacting or addition of the mixture to the hydrocarbon liquid is achieved preferably under conditions of agitation. These catalysts include those having both reduced and oxidized surfaces and particularly those having an average particle size below 20 and preferably below 10 microns, as set forth above. Such catalysts include hydroprocessing catalysts used in slurry hydroprocessing and particularly hydrocarbon synthesis catalysts used in a slurry Fischer-Tropsch hydrocarbon synthesis process. By hydroprocessing is meant a process in which hydrogen reacts with a hydrocarbonaceous feed to remove one or more heteroatom impurities such as sulfur, nitrogen, and oxygen, to change or convert the molecular structure of at least a portion of the feed, or both. Hydroprocessing includes hydroconversion. By hydroconversion is meant one or more catalytic operations in which hydrogen is a reactant and the molecular structure of at least a portion of the hydrocarbon or hydrocarbonaceous material is changed. Non-limiting examples of hydroprocessing processes which can be practiced by the present invention include forming lower boiling fractions from light and heavy feeds by hydrocracking; hydrogenating aromatics and other unsaturates; hydroisomerization and/or catalytic dewaxing of waxes and waxy feeds, removal of one or more heteroatom impurities such as sulfur, nitrogen and oxygen and demetallation of heavy streams. Ring-opening, particularly of naphthenic rings, can also be considered a hydroprocessing process. By hydrocarbonaceous is meant a primarily hydrocarbon material obtained or derived from crude petroleum oil, from tar sands, from coal liquefaction, shale oil, hydrocarbon synthesis processes and the like.

The reaction stages used in these processes are operated at suitable temperatures and pressures for the desired reaction. For example, typical hydroprocessing temperatures will range from about 40° C. to about 450° C., at pressures from about 50 psig to about 3,000 psig, preferably 50 to 2,500 psig. Typical hydroprocessing catalysts comprise one or catalytic metal components supported on, ion exchanged or impregnated onto or into, or composited with, one or more inorganic refractory oxide materials well known for catalyst use such as, one or more of silica, crystalline or amorphous silica-alumina, titania, zirconia, various clays, and the like. The one or more catalytic metal components will comprise a metal or compound of one or metals from, for example, Groups IV, VI and VIII of the Periodic Table of the Elements copyrighted by the Sargent-Welch Scientific Company in 1968.

In a Fischer-Tropsch slurry hydrocarbon synthesis process, a synthesis gas comprising a mixture of $H_2$ and CO is bubbled up into a reactive slurry in which the $H_2$ and CO react in the presence of a Fischer-Tropsch type of hydrocarbon synthesis catalyst to form hydrocarbons and preferably liquid hydrocarbons. The mole ratio of the hydrogen to the carbon monoxide may broadly range from about 0.5 to 4, but which is more typically within the range of from about 0.7 to 2.75 and preferably from about 0.7 to 2.5. The stoichiometric mole ratio for a Fischer-Tropsch hydrocarbon synthesis reaction is 2.0, but there are many reasons for using other than a stoichiometric ratio as those skilled in the art know and a discussion of which is beyond the scope of the present invention. In a slurry hydrocarbon synthesis process, the mole ratio of the $H_2$ to CO is typically about 2.1/1. Methanol is preferred as at least a portion of the liquid polar oxygenate in the process of the invention, because theoretically, in a hydrocarbon synthesis reactor, it will be in equilibrium with $H_2$ and CO in a mole ratio of 2:1, according to the relation below:

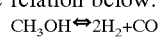

The synthesis gas may be formed by any convenient means known to those skilled in the art, such as non-catalytic and catalytic partial oxidation, steam reforming and combinations of partial oxidation and steam reforming, such as autothermal reforming, and fluid bed synthesis gas generation (FBSG) as is disclosed, for example, in U.S. Pat. Nos. 4,888,131 and 5,160,456. This need not be further explained. As mentioned above, the reactive hydrocarbon synthesis slurry comprises catalyst particles and gas bubbles in a slurry liquid. The slurry liquid comprises hydrocarbon products of the synthesis reaction which are liquid at reaction conditions. While the temperature and pressure in the slurry can vary widely depending on the particular catalyst used and products desired, typical conditions effective to form hydrocarbons comprising mostly $C_{5+}$ paraffins, (e.g., $C_{5+}$–$C_{200}$) and preferably $C_{10+}$ paraffins, in a slurry HCS process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (0° C., 1 atm) per hour per volume of catalyst, respectively. The synthesis gas space velocity is determined primarily by the hydrocarbon production of the reactor and is typically greater than that required to disperse the solid catalyst particles in the slurry liquid. The internal mixing conditions in a slurry hydrocarbon synthesis reactor are more than sufficient to disperse the catalyst particles in the slurry liquid in the practice of the invention. The slurry typically contains from about 10 wt. % to 70 wt. % catalyst solids, more typically from 30 wt. % to 60 wt. % and in some embodiments 40 wt. % to 55 wt. % is preferred. In addition to particulate catalyst solids, the slurry may also contain particulate heat transfer solids which are inert with respect to the hydrocarbon synthesis reaction, as is known. As mentioned above, the slurry liquid comprises hydrocarbon products which are liquid at the reaction conditions, along with minor amounts of other components. While catalyst particle sizes may broadly range from as small as 1 to as large as 200 microns, a typical conventional Fe or supported iron catalyst will have a mean particle size of about 20 microns, while a catalyst comprising a catalytic metal such as cobalt composited with or supported on titania will typically have a mean particle size of about 50–60 microns. Such catalysts will also include fine particles as small as 1 micron, because the constant agitation and mixing of the catalyst particles in the slurry results in particle size reduction through attrition. However, it is preferred to use catalysts having a smaller average particle size. Smaller catalyst particles provide more external surface and heat transfer per unit weight of the catalyst and require less pore diffusion into the catalyst. With the present invention, it is now possible to use catalysts having an average mean diameter or particle size less than 20 and even less than 10 microns. Suitable Fischer-Tropsch reaction types of catalyst comprise, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674.

During the hydrocarbon synthesis reaction, water and alcohols are produced as byproducts of the reaction and, along with methane, carbon dioxide, nitrogen, unreacted synthesis gas and synthesized hydrocarbons which are gaseous at the reaction conditions, pass up through the reactor and are removed as gaseous overhead, referred to as the reactor tail gas. Alcohols produced using a catalyst containing a cobalt catalytic component comprise primarily methanol (e.g., typically greater than 50 and even 75 wt. %), along with minor amounts of ethanol, propanol and butanol. When the reactor tail gas is cooled, the reaction water and some of the hydrocarbons condense out of the gas as liquids which are separated from the rest of the gas. Most (e.g., >90%) of the alcohols are present in solution in the aqueous liquid condensate. They may be recovered from this solution by known means such as distillation, extraction, absorption, precipitation and the like.

The hydrocarbons produced by a hydrocarbon synthesis process according to the invention are typically upgraded to suitable products, by subjecting all or a portion to fractionation and/or conversion. By conversion is meant one or more operations in which the molecular structure of at least a portion of the hydrocarbon is changed and includes both noncatalytic processing (e.g., steam cracking), and catalytic processing in which a fraction is contacted with a suitable catalyst, with or without the presence of hydrogen or other coreactants. If hydrogen is present as a reactant, such process steps are typically referred to as hydroconversion and include, for example, hydroisomerization, hydrocracking, hydrodewaxing, hydrorefining and the more severe hydrorefining referred to as hydrotreating. Illustrative, but nonlimiting examples of suitable products formed by upgrading include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

Turning now to FIG. 1, which is a simplified schematic flow scheme of a typical slurry Fischer-Tropsch hydrocarbon synthesis process, hydrocarbon synthesis reactor 10 comprises an elongated, cylindrical steel vessel containing a three phase slurry 12 within, which comprises a hydrocarbon slurry liquid comprising hydrocarbon products of the synthesis reaction which are liquid at the reaction conditions, in which is dispersed the particulate hydrocarbon synthesis catalyst and gas bubbles, as indicated by the solid dots and open circles. A liquid and otherwise gas impervious gas distribution tray or plate 14, located at the bottom of the slurry over the feed gas plenum area 16, contains a plurality of gas injection means (not shown) for injecting the synthesis gas feed up into the slurry. The synthesis feed gas comprises a mixture of $H_2$ and CO, and is fed into the reactor via synthesis gas feed line 18. Unreacted feed gas and products of the synthesis reaction which are gas or vapor at the reaction conditions, rise up through the slurry into gas collection area 20, from which they are removed overhead via line 22. The hydrocarbon slurry liquid is continuously removed from the reactor as filtrate, by filtration means immersed in the slurry, briefly indicated by box 24, and passed via line 26 to one or more upgrading operations (not shown). Upgrading operations include fractionation and/or one or more conversion operations in which the molecular structure of at least a portion of the liquid is converted or changed, with or without using hydrogen as a reactant. Mixing vessel 28 contains mixing means within, indicated in this illustration as a simple propeller mixer 30, connected by shaft 32 to motor 34. Fresh or reactivated, dry, small particle size hydrocarbon synthesis catalyst particles, in a nonreactive atmosphere, are introduced into vessel 28 via line 36. One or more polar oxygenate liquids and preferably one or more one to four carbon atom alcohols, are introduced into the vessel via line 38. The catalyst particles disperse in the agitated, polar oxygenate liquid to form a pumpable slurry, which is passed into the reactor via line 40. The agitation of the slurry in the reactor caused by the uprising gas bubbles is sufficient to disperse the small catalyst particles in the hydrocarbon slurry liquid.

Figure 2:
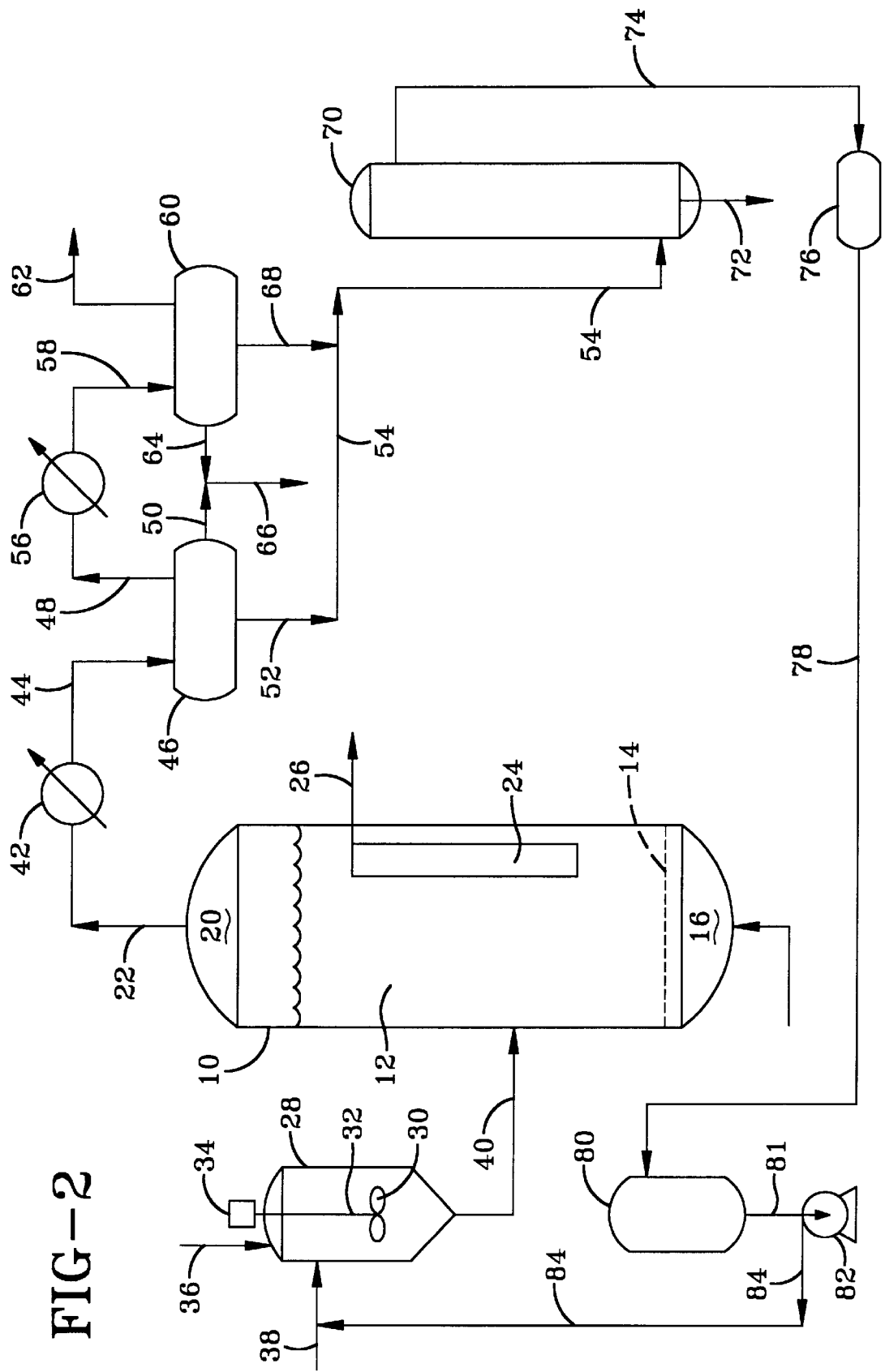
FIG. 2 schematically illustrates a simplified flow plan of a slurry Fischer-Tropsch hydrocarbon synthesis process according to the invention, in which the polar oxygenate comprises alcohols produced by the reaction, at least a portion of which are recovered and used to disperse the catalyst.

FIG. 2 schematically illustrates an embodiment of an integrated slurry Fischer-Tropsch hydrocarbon synthesis process in which the alcohols produced by the synthesis reaction are recovered and used as all or a portion of the alcohol used to form a dispersion of the fresh or regenerated catalyst for transfer into the slurry reactor. The polar oxygenates produced by a slurry Fischer-Tropsch hydrocarbon synthesis process employing a catalyst containing a cobalt catalytic component, comprise primarily methanol and ethanol, with minor amounts of higher carbon atom oxygenates. The methanol is produced in the greatest amount. In this embodiment, the same numbers as shown in FIG. 1 refer to the same components and process details and need not be repeated. The reactor tail gas removed overhead via line 22 comprises unreacted synthesis gas and reaction products which are gas and vapor at the reaction conditions. The reactor operates at less than 100% CO conversion (e.g., 80%) and the resulting tail gas comprises mostly unreacted $H_2$ and CO, $CO_2$, water vapor and methane, along with $C_2$–$C_{10}$ hydrocarbons, nitrogen and minor amounts of alcohols comprising mostly methanol produced by the synthesis reaction, as mentioned above. An example based on 100 moles of alcohols produced per arbitrary unit of time in the reactor would be roughly about 75% methanol, 15% ethanol, 2% propanol and 1% butanol. The tail gas is passed through a hot heat exchanger 42, in which it is cooled to about 300° F., to condense a portion of the water, alcohols and hydrocarbons to liquids, with the gas and liquid mixture passed into separator 46 via line 44, in which a hydrocarbon layer and an aqueous layer form, with the remaining gas passed to cold heat exchanger 56, via line 48. Heat exchanger 56 cools the remaining tail gas to about 125° F. and more hydrocarbons, water and alcohols are condensed out as liquids and are passed into separator 60, via line 58, where they form an aqueous layer and a hydrocarbon layer. The uncondensed gas is removed from the separator 60 via line 62. The condensed hydrocarbon liquids are removed from the separators via lines 50 and 64, combined into line 66 and sent to further processing. The aqueous liquid layer, which contains the condensed alcohols, is removed via lines 52 and 68 and passed into line 54, which passes them into fractionater 70, from which the alcohols are separated from the water, with the water removed via line 72 and the alcohols via 74. The recovered alcohols pass via line 74 through drier 76 and then to storage tank 80 via line 78. When needed, this alcohol mixture, comprising mostly methanol, is withdrawn from 80 via line 8 and passed into pump 82. Pump 82 pumps the alcohol into lines 84 and 38 into mixing vessel 28. While only a single stage hydrocarbon synthesis process has been shown for the purpose of illustrating the invention, two or more stages may be used, with tail gas cooling and condensation after each stage. Single stage cooling may also be used instead of the hot and cold stages illustrated. Further, as set forth under the SUMMARY, if desired, a hydrocarbon liquid may also be passed into the mixing vessel along with the alcohol, provided that there is sufficient alcohol present to avoid clumping of the catalyst particles. This is determined experimentally.

The invention will be further understood with reference to the examples below.

EXAMPLES

Example 1

Activated Fischer-Tropsch hydrocarbon synthesis catalyst particles were prepared from about 8 cc (7.5 g) of a catalyst precursor comprising cobalt oxalate composited with a refractory metal oxide support material comprising fumed silica. The fumed silica was obtained from Cabot Corporation and was reported to have a structure consisting of primary particles fused into branched and chain-like aggregates having an effective diameter of about 0.1 to 5 microns in the form of aggregates ranging from 0.5 to 44 microns in effective diameter. The precursor comprised 21.1 wt. % Co in the oxalate form and 2.12 wt. % Re as $HReO_4$. This was heated under a hard vacuum of a few mm of Hg in a glass activation vessel (a glass vial) and held at 440° C. for an hour. The resulting catalyst is pyrophoric and had an average particle diameter of about 1 micron. After cooling, a sufficient quantity of nitrogen purged Norpar® 15 solvent, which is a high purity mixture of $C_{12}$–$C_{16}$ normal paraffins (mostly $C_{15}$), was drawn into the vial so that the height of the Norpar solvent added to the vial was twice the height of the activated catalyst particles in the bottom, in order to insure the presence of more than enough solvent to wet, and thereby disperse and slurry the particles in the solvent. After vigorous shaking for several minutes, most of the catalyst coated the interior walls of the vessel and that portion of the catalyst which had been suspended, quickly settled out on the bottom as clumps or agglomerates.

Example 2

Example 1 was repeated and the same poor results were achieved. However, after the catalyst had settled out on the walls and bottom of the vessel, 7 cc of methanol was added and the vessel again vigorously shaken for several minutes. This resulted in the catalyst dispersing in the mixed liquids to form a slurry.

Example 3

In this experiment, the same catalyst precursor and activation were used as in Example 1, except that methanol was drawn into the vessel instead of the Norpar. Only enough methanol was added (about 8 cc) to barely cover the activated catalyst on the bottom of the vessel, so that any exothermic response to the catalyst wetting could be noted. Warming of the glass wall of the activation vessel could be detected by touch. This thus demonstrated that the catalyst wetting by the methanol produces no hazardous exotherm at room temperature, when the methanol to catalyst ratio is small.

Example 4

A small quantity (2.75 g, ~3–4 cc) of the same catalyst precursor used in Example 1 was heated in air in a small glass drying vessel, at a temperature of 400° C., cooled down to 150° C., the glass vessel sealed and cooled down to room temperature. To this was added 10 cc of the Norpar solvent, with the vessel then shaken and observed, as in the previous experiments. After vigorous shaking, the unactivated, dry catalyst was observed to be only marginally suspended and adhered strongly to the glass wall inside the vessel. This demonstrates that small particles of this type are very difficult to disperse in a hydrocarbon liquid.

Example 5

The experiment of Example 4 was repeated, except that in this experiment methanol was used instead of the Norpar. The unactivated catalyst particles readily dispersed and were suspended in the methanol upon shaking. There was no visible evidence of the catalyst adhering to the wall inside the glass vessel. Those skilled in the art will appreciate that his experiment demonstrates the usefulness of the invention, irrespective of whether or not the small catalyst particles are activated or unactivated.

Example 6

Approximately 2000 grams of the small particle Fischer-Tropsch catalyst precursor of Example 1 was activated by reduction under high pressure flowing hydrogen at 370° C. and then transferred to a carbon steel transfer vessel, so that the catalyst could be added to a large Fischer-Tropsch slurry reactor. About 4000 grams of the Norpar 15 hydrocarbon solvent was then added to the vessel under 30 psi of argon and the vessel vigorously shaken for several minutes, in an attempt to form a slurry of the activated catalyst in the hydrocarbon solvent. This was done to simulate a mixing vessel (shown as 28 in FIGS. 1 and 2). However, instead of dispersing in the Norpar, the small particle size particulate catalyst formed clumps of catalyst particles which were large enough to be felt tumbling around inside the vessel, during the vigorous shaking. In a hydrocarbon synthesis plant this would result in plugging the catalyst transfer line going from the mixing vessel to the reactor and possibly even the mixing vessel. It would also result in a considerable quantity of the catalyst particles adhering to the transfer line and mixing vessel wall, instead of entering into the reactor. After the vigorous shaking, the clumped catalyst and solvent mixture was immediately added to the hydrocarbon liquid slurry in a large Fischer-Tropsch slurry reactor. In an attempt to recover catalyst particles which were clumped and which adhered to the walls of the mixing vessel, another 4000 grams of the Norpar hydrocarbon liquid was added to the vessel, which was then shaken even more vigorously than before. However, the clump inside the vessel did not dissipate. As before, the catalyst and solvent mixture was immediately added to the reactor. However, a considerable amount of catalyst remained in the vessel even after this second Norpar addition and agitation. The mixing vessel was weighed before and after each Norpar addition, and this revealed than only about half of the catalyst initially added to the vessel had been charged to the reactor with the first and second Norpar additions.

Next, about 1500 grams of methanol was added to the transfer vessel and the catalyst clumps immediately dissipated with only minor agitation, in that they could no longer be felt striking the vessel wall during the agitation. The mixture of catalyst, methanol and some Norpar was added to the reactor. The vessel was reweighed, which revealed that just about all of the catalyst that had remained in the mixing vessel after the Norpar additions, was added to the reactor after being mixed with the methanol. In this particular experiment, the mixing vessel was a three foot long cylindrical steel vessel six inches in diameter and the transfer line was a one-half inch diameter steel pipe.

Example 7

About 2000 grams of the reduced catalyst described above in Example 6 were placed in a carbon steel transfer vessel (and transfer line) similar to that of Example 6, under a blanket of hydrogen. Then about 2000 grams of methanol was drawn into the vessel under 30 psig of argon and the vessel shaken vigorously for several minutes. No clumps could be felt in the transfer vessel during the shaking, and the slurry of catalyst and methanol formed by the shaking was easily added to the hydrocarbon liquid slurry in the large Fischer-Tropsch slurry reactor. That is, the slurry flowed easily and no clumps could be felt in the mixing vessel. Addition of the slurry to the reactor was achieved by a 25 psig pressure differential between the transfer vessel and reactor. Weights taken before and after the addition of the slurry to the reactor, revealed that almost all the catalyst had been charged to the reactor.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for forming a slurry comprising catalyst particles having an average particle size less than 20 microns dispersed in hydrocarbon liquid which comprises contacting said particles with at least one liquid, non-acid polar oxygenate wherein said polar oxygenate is selected form the group consisting of at least one alcohol, ether, ketone ester and mixture thereof to form a mixture comprising said particles and oxygenate and contacting said mixture with said hydrocarbon liquid to form said slurry.

2. A process according to claim 1 wherein said oxygenate comprises one or more one to four carbon atom alcohols.

3. A process according to claim 2 wherein said particles comprise at least one Group VIII metal component.

4. A process according to claim 1 wherein said average particle size is less than 10 microns.

5. A process according to claim 3 wherein said average particle size is less than 10 microns.

6. A process according to claim 3 wherein said particles are agglomerated with a hydrocarbon liquid prior to contacting said polar oxygenate.

7. A process according to claim 3 wherein said polar oxygenate comprises methanol.

* * * * *